(12) United States Patent
Young (10) Patent No.: US 6,253,272 B1
(45) Date of Patent: Jun. 26, 2001

(54) EXECUTION SUSPENSION AND RESUMPTION IN MULTI-TASKING HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/088,810

(22) Filed: Jun. 2, 1998

(51) Int. Cl.[7] ................................................ G06F 13/14
(52) U.S. Cl. ............................................................ 710/129
(58) Field of Search .................................... 710/129, 263, 710/268; 709/100, 107, 108

(56) References Cited

U.S. PATENT DOCUMENTS 5,659,690 * 8/1997 Stuber et al. ...................... 710/129
6,088,787 * 7/2000 Predko ................................ 712/202
6,112,272 * 8/2000 Gates .................................. 710/129

* cited by examiner

*Primary Examiner*—Glenn A. Auve
(74) *Attorney, Agent, or Firm*—Gunnison, McKay & Hodgson, L.L.P.; Forrest Gunnison (57) ABSTRACT

A method for suspending and resuming execution of firmware routines facilitates high speed concurrent processing within a multi-tasking integrated circuit that interfaces a first input/output (I/O) bus with a second input/output bus. The method uses a single instruction in a first executing routine to save a return address, and to transfer execution to a second routine. Similarly, a single return instruction in the second routine is used to restore the return address and to transfer execution from the second routine to the first routine. The use of single instructions in the two routines reduces the silicon area required to store the firmware, and enhances execution performance.

19 Claims, 7 Drawing Sheets

EXECUTION SUSPENSION AND RESUMPTION IN MULTI-TASKING HOST ADAPTERS

BACKGROUND OF THE INVENTION

1. Field of the Invention

This invention relates generally to host adapters for interfacing between I/O buses, and in particular to task suspension and resumption in multi-tasking host adapters.

2. Description of Related Art

Prior single chip host adapters have been single task devices. For example, U.S. Pat. No. 5,659,690, entitled "Programmably Configurable Host Adapter Integrated Circuit Including a RISC Processor," issued on Aug. 19, 1997 to Stuber et al., which is incorporated herein by reference, had a single data channel connecting a SCSI bus with a host computer bus. An on-chip RISC processor, sometimes called a sequencer, managed all of the modules on the chip through a set of registers.

This host adapter was multi-tasking in the sense that multiple commands, each for a different SCSI target, could be in process at any given time. However, hardware in the host adapter could execute only one task at a time, such as transferring data from one SCSI target to the host computer. The sequencer managed the one task until either completion or interruption of the task. Upon completion or interruption of the task, the sequencer disabled the hardware and then reconfigured the hardware for a different task.

Since the hardware on the host adapter chip could execute only one task at a time, the sequencer on the chip managed only the one active task at a time. Consequently, there were long periods of time in which the sequencer was idle, and was waiting for an event such as the end of the data transfer. While the sequencer was capable of performing other tasks, the hardware limitations made such performance unusable.

A subsequent host adapter integrated circuit had two independent data channels that were managed by a single on-chip sequencer. One of the data channels could be transferring data between the host computer and SCSI buses, while the other of the data channels could be transferring administrative data such as I/O command blocks, scatter/gather lists, or command completions notifications from or to the host computer. In this host adapter integrated circuit, rather than wait for an event associated with one of the two data channels, the sequencer waited in an idle loop for an event in either of the two data channels. This permitted the sequencer to concurrently supervise active tasks in both the channels, and to provide timely service when required.

The suspension and resumption of execution of a task by the sequencer is relatively simple, if execution can be suspended at only one point to await an event. In this case, when the sequencer reaches the point where execution of a first task can be suspended to wait for an event, the sequencer suspends execution of the first task by jumping to the idle loop, and looking for another task to execute. (It should be understood that the sequencer only executes firmware command lines. Therefore, stating that the sequencer jumps means that the sequencer executes a jump instruction in a firmware command line. Herein, any statement about a sequencer taking some action should be interpreted as the sequencer executing an instruction that results in the stated action.) When the sequencer is in the idle loop and the event associated with the first task is detected, the sequencer jumps back to the first task and resumes execution of that task.

The suspension and resumption of multiple tasks is more difficult to manage if there are multiple re-entry points associated with a single event. For example, typically, multi-tasking host-adapter firmware routines included a dedicated firmware routine for transfer of I/O command blocks, another dedicated firmware routine for transfer of scatter/gather lists, and yet another dedicated firmware routine for transfer of command completion notifications. Each of these routines enabled a DMA transfer to or from the host computer, and waited in the idle loop for completion of the transfer. The event, that caused the sequencer to resume execution of each of these routines, was a "DMA done" event. Each of these routines had a re-entry point for the DMA done event, and the sequencer had to decide which re-entry point to jump to in response to the DMA done event.

Tags are one way that is commonly used to determine which re-entry point to use. For example, in process 100 (FIG. 1), the sequencer executes a first group of instructions in first instruction set operation 101, e.g., initializes a data channel for a data transfer. The sequencer transfers processing from operation 101 to data available check 102. In data available check 102, the sequencer determines whether a first set of required data are available locally or need to be transferred over the I/O bus to the local memory. If the data are available locally, processing transfers to second instruction set operation 107.

Figure 1:
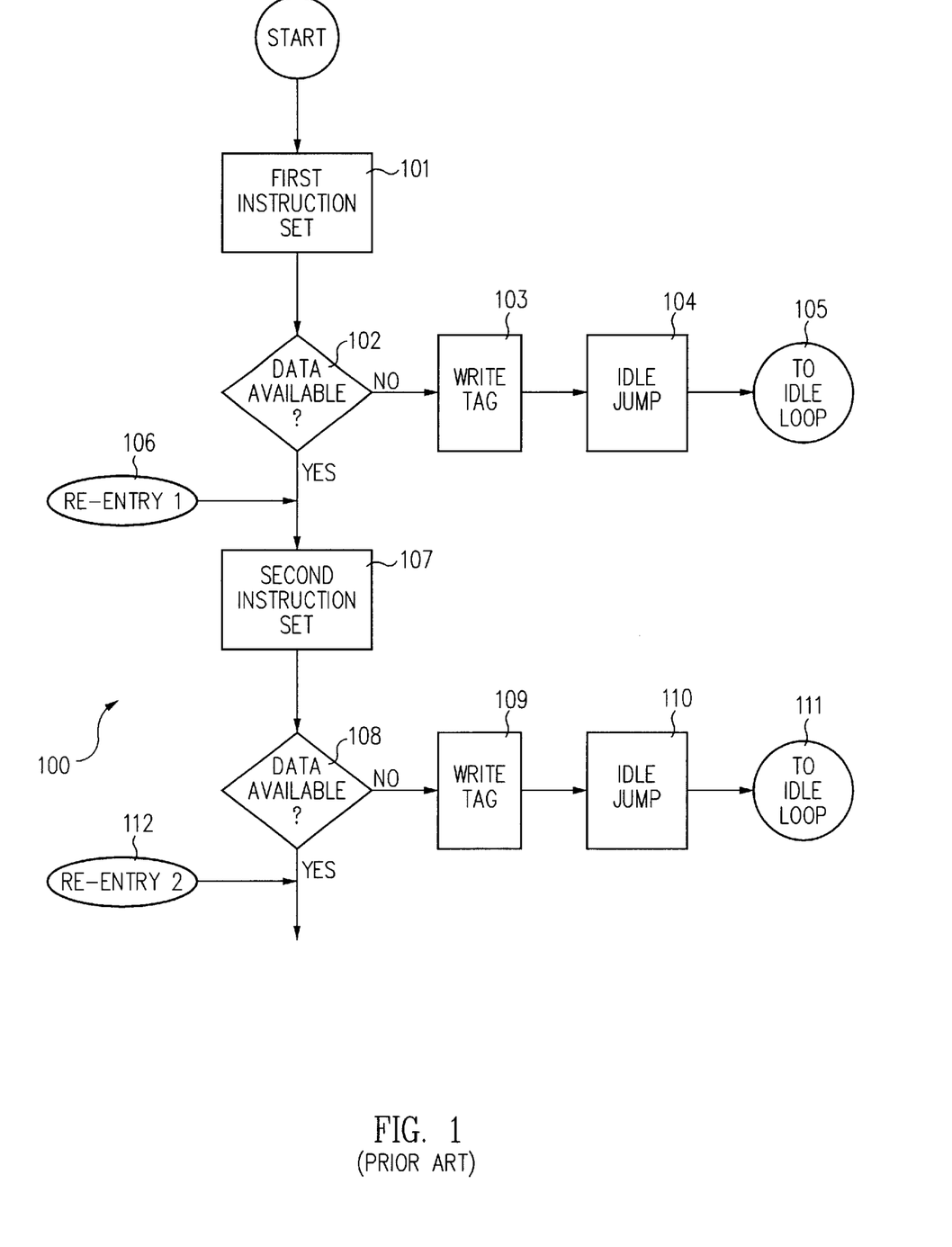
FIG. 1 is a process flow diagram that illustrates the prior art operations in suspending execution of a task and jumping to an idle loop process.

However, if the data are not available locally, prior to jumping to the idle loop to wait for the data transfer, the sequencer transfers from data check 102 to write tag operation 103. In write tag operation 103, the sequencer executes an instruction that writes a unique tag, which identifies the routine, to scratch memory. After the tag is written, processing transfers to idle jump operation 104 in which the sequencer jumps to the idle loop as represented by idle loop node 105. Thus, to suspend execution of task 100, two instructions are required, the write instruction in operation 103, and the jump instruction in operation 104.

When the sequencer is in the idle loop and an event occurs that can have multiple re-entry points, the sequencer compares each of a set of possible tags for that event with the tag in scratch memory. When a match is found, the sequencer jumps to the re-entry point (program address) associated with the stored tag, e.g., re-entry point 106. Thus, in this instance, two instructions for each re-entry point, a compare and a jump to the re-entry point, were used. Alternatively, another sequencer used a single instruction that combined the compare and the jump in a single instruction. Nevertheless, in either instance, if there are multiple re-entry points, multiple instructions are required to determine the re-entry point. This basic process is repeated by operations 108 to 112 for the next set of data that are required.

This method of determining re-entry points has several disadvantages. The method requires a program instruction to write the tag to scratch memory, and this instruction must be executed each time the routine is suspended, which adds to the total execution time. When there are many points of execution suspension, there are many additional instructions that must be added to the firmware, which in turn increases the storage area required for the firmware. Typically, the die storage area available for firmware is limited and so it may be necessary to limit other firmware functionality to support saving the tags and still fit the firmware in the available storage area.

Also, the routine that processes the event must have at least one instruction for every firmware routine re-entry point that can be associated with that event. If there are multiple re-entry points, each must at least one instruction in the idle loop. This increases both the execution time and the required storage area.

In the worst case, the instruction with the matching tag is the last one in the list, and so all of the other instructions must be executed before the desired instruction is reached. Since the increased execution times and storage requirements are unattractive, a new method for suspending and resuming tasks is needed for multi-tasking host adapters.

In addition, while various schemes have been used for suspending and resuming task execution in multi-tasking microprocessors, these schemes have not been extended to host adapters because of the extensive hardware and/or firmware required to support the schemes. It is not practical to include a full-blown multi-tasking processor on the same die as the other circuits required for a host-adapter. Consequently, the task suspension and resumption solutions utilized in multi-tasking microprocessors are also unavailable.

SUMMARY OF THE INVENTION

According to the principles of this invention, a novel method for suspending and resuming execution of firmware routines facilitates high speed concurrent processing within a multi-tasking integrated circuit that interfaces a first input/output (I/O) bus with a second input/output bus. In one embodiment, the method of this invention uses a single instruction in a first executing routine to save a return address, and to transfer execution to a second routine. Similarly, a single return instruction in the second routine is used to restore the return address and to transfer execution from the second routine to the first routine. The use of single instructions in the two routines eliminates many lines of prior art firmware instructions which in turn reduces the silicon area required to store the firmware, and enhances execution performance.

Hence, in one embodiment, execution of a first routine, which is used with a first I/O bus interface circuit in the multi-tasking integrated circuit interfacing two I/O buses, is suspended by executing a single instruction to branch from the first routine to a second routine. Execution of the single instruction results in writing a return address for the first routine in a first storage location, and branching to the second routine. Typically, this single instruction is executed when the on-chip sequencer must wait for the transfer of more information before execution of the first routine can continue.

While the on-chip sequencer is waiting for the information transfer, i.e., waiting for an event that signals that the information transfer is complete, the on-chip sequencer executes the second routine. The sequencer can transfer to other routines, execute these routines, and then transfer to the second routine again.

In one embodiment, the execution of the second routine results in checking for the event associated with the first routine. When that event is detected, processing is transferred form the second routine to the first routine by executing a single instruction in the second routine that restores the return address in the first storage location, and that causes the on-chip sequencer to resume execution of the first routine at the return address.

In one embodiment, the first storage location is on a stack used by all of the plurality of routines. Since the on-chip sequencer can execute another routine that also may be suspended, the second routine moves the return address from the first storage location to a second storage location upon execution of the second routine. This prevents overwriting of the return address by another routine that suspends execution. In this embodiment, restoring the return address to the first storage location requires moving the return address from the second storage location to the first storage location.

The second routine can be an idle loop routine and the idle loop routine checks for an event during execution of the idle loop routine. Upon detection of the event, the single instruction is executed that moves the return address from the second storage location to the first storage location, and returns to execution of the first routine.

In another embodiment, the second routine returns from the second routine to the first routine to check for an event. Upon the return, the first routine checks for the event. The first routine transfers back to the second routine upon the checking for the event failing to detect the event.

In another embodiment, the first storage location is on a stack used only by the first routine. The stack is included in a module memory of the first I/O bus interface circuit.

An I/O bus interface integrated circuit having a plurality of modules for interfacing with I/O buses, and an on-chip sequencer, the I/O bus interface circuit includes a stack select register. Information in the stack select register is used in addressing one of a common stack used by the on-chip sequencer as storage for return addresses of suspended routines, and independent stacks used by the on-chip sequencer for return addresses of suspended routines. The interface circuit also includes a stack mode definition bit. When the stack mode definition bit has a first state, the common stack is used by the on-chip sequencer, and when the stack mode definition bit has a second state, the independent stacks are used by the on-chip sequencer.

BRIEF DESCRIPTION OF THE DRAWINGS

Herein, elements with the same reference numeral are the same element.

DETAILED DESCRIPTION OF THE INVENTION

According to the principles of this invention, a novel architecture and method are utilized for suspending and resuming tasks to facilitate high speed concurrent processing within an I/O bus interface integrated circuit 200 (FIG. 2A), hereinafter I/O bus interface circuit 200, that interfaces a first input/output (I/O) bus 291, such as a PCI bus, with a second input/output bus 292, such as Fiber Channel links. Alternatively, one I/O bus could be a host computer bus, and the other I/O bus a SCSI bus, or both I/O buses could be SCSI buses.

Figure 2A:
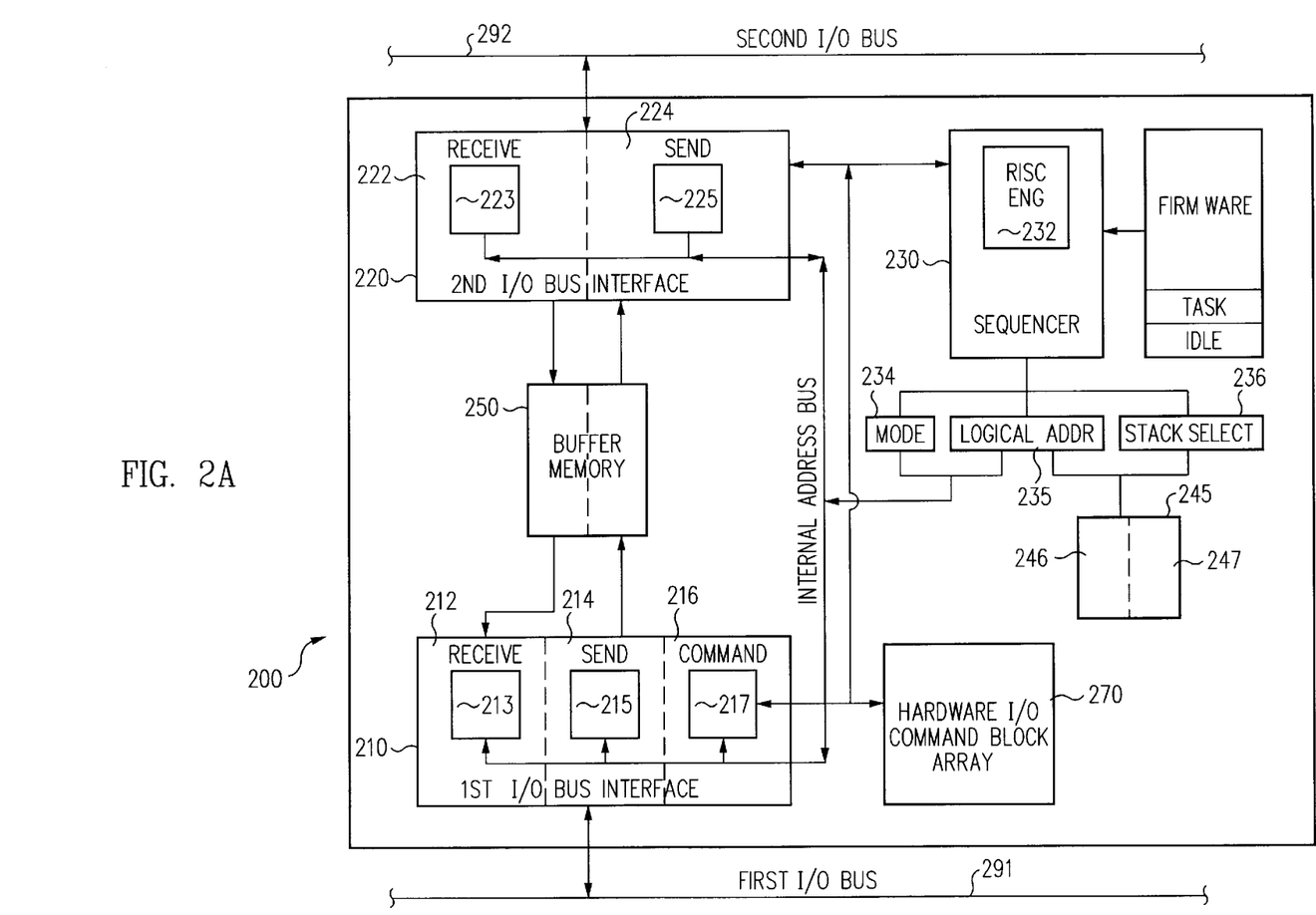
FIG. 2A is a block diagram of a first embodiment of an integrated circuit that is an interface between two I/O buses, and that includes the novel architecture and implements the novel method for suspending and resuming tasks in a multi-tasking environment, according to the principles of this invention.

In one embodiment, as described more completely below, this novel method and architecture utilize either a single stack, or a multiplicity of stacks. In either case, the number of instructions required for suspending and resuming tasks has been significantly reduced over the prior art. In addition, the execution time associated with suspending and resuming tasks in multi-tasking I/O bus interface circuit 200 has been significantly reduced. Consequently, this invention reduces the die area associated with firmware, and enhances the multi-tasking performance of I/O bus interface circuits such as host-adapters. Consequently, the host-adapters of this invention can be utilized with new high-speed technologies for data storage, such as Fiber Channel, that require multi-tasking high-speed performance.

I/O bus interface integrated circuit 200 includes a first I/O bus interface hardware block 210, a second I/O bus interface hardware block 220, an on-chip sequencer 230, and a hardware I/O command block array 270. Each of the plurality of hardware blocks 210 and 220 includes a plurality of modules.

Hardware block 210, in this embodiment, includes a receive module 212, a send module 214 and a command module 216. Each of modules 212, 214, and 216 includes a dedicated module memory 213, 215, and 217, respectively, that is accessed by a RISC engine 232 in sequencer 230.

Hardware block 220, in this embodiment, includes a receive module 222, and a send module 224. Each of modules 222, and 224 includes a dedicated module memory 223, and 225, respectively, that is accessed by RISC engine 232.

At any instance in time, only a single module can be accessing the I/O bus connected to the interface hardware block containing that module. However, at a given point in time, sequencer 230 can be only executing one routine for each of the independent modules.

Those of skill in the art will appreciate that I/O bus interface integrated circuit 200 may include other memories and hardware circuits. However, such components are not necessary to understand this invention and so are not included to avoid detracting from the invention.

Each dedicated module memory 213, 215, 217, 223, and 225 has the same set of logical addresses, but a different set of physical addresses. The physical address for a particular storage location in one dedicated module memory is a combination of a module identifier in mode select register 234 and a logical address 235 of the particular storage location. Since the module identifier is different for each dedicated module memory, this provides a unique physical address for each storage location in dedicated module memories 213, 215, 217, 223, and 225 of I/O bus interface circuit 200.

Each of modules 212, 214, 216, 222 and 224 operates independently from the other module. At given point in time, each of modules 212, 214, 216, 222 and 224 can be performing a different task, but only one of modules 212, 214, and 216 can be accessing I/O bus 291. Similarly, only one of modules 222 and 224 can be accessing I/O bus 292 at a given point in time. The task executed by a module is specified by a hardware I/O command block that is stored in hardware I/O command block array 270.

For example, when command module 216 is fetching elements from a scatter/gather list over first I/O bus 291, one hardware I/O command block in array 270 includes information that specifies the memory addresses of the elements, and information that defines which module firmware is to be executed after a predefined number of the elements in the scatter/gather list are fetched. At the same time that first I/O bus interface hardware block 210 is transferring data, receive module 222 in second I/O bus interface hardware block 220 can be performing a task, e.g., transfer of data from second I/O bus 292 to buffer 250, that is specified by another hardware I/O command block in array 270.

In each case, sequencer 230 configures locations in the dedicated module memory to enable the module to perform the desired task. Further, storage locations within each dedicated module memory within an I/O bus interface hardware block, which are used for the same function or operation, have the same logical addresses. This permits use of a single routine by sequencer 230 to implement the operation or function in modules in that I/O bus interface hardware block. This is described more completely in copending, commonly filed, and commonly assigned, U.S. patent application Ser. No. 09/089,013, entitled "System for Register Partitioning in Multi-Tasking Host Adapters by Assigning a Register Set and a Unique Identifier in Each of a Plurality of Hardware Modules," of B. Arlen Young, which is incorporated herein by reference in its entirety.

When sequencer 230 is executing a firmware routine for command module 216, e.g., routine TASK (FIG. 2A), that is represented by process flow diagram 300 (FIG. 3), after execution of a first group of instructions in first instruction set 301, a point is reached where data are required for execution to continue. In this example, sequencer 230 determines in data available check 302 whether the required data are available locally. If the data are available, sequencer 230 continues execution of the instructions in second instructions set operation 305. However, if the data are unavailable, sequencer 230 transfers processing from check 302 to call idle operation 303.

Figure 3:
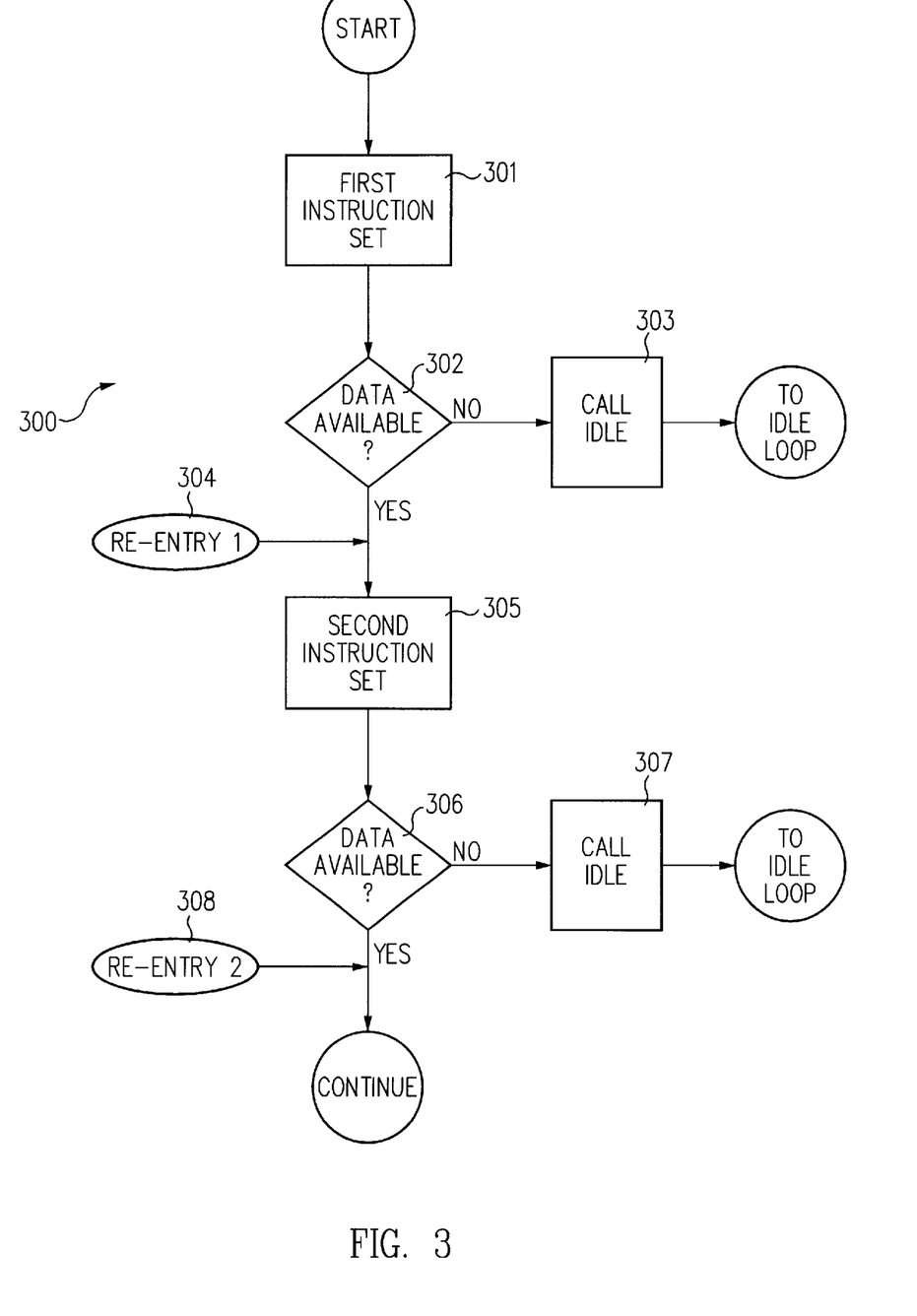
FIG. 3 is a process flow diagram for a routine that utilizes a single instruction to save a return address, and to transfer to another routine according to the principles of this invention.

In call idle operation 303, sequencer 230 calls the idle loop routine, in contrast to the prior art method of FIG. 1 that jumped to the idle loop routine. The one call instruction not only transfers sequencer execution to the idle loop routine, but also saves the re-entry address, sometimes called the return address, for re-entry point 304 in routine TASK 300. Thus, as used herein, a call instruction performs two operations: a save of a re-entry address; and a transfer to a routine specified in the call instruction.

The particular storage location used, in execution of the call instruction, to save the re-entry address depends upon the particular embodiment of this invention that is utilized. In a first embodiment, as illustrated in FIG. 2A, tasks which cannot be executed concurrently share a common return address stack 246 in memory 245, and tasks which can be executed concurrently each have a different stack, e.g., independent stacks 246 and 247.

For example, a task that fetches new commands from a host computer (not shown), and a task that fetches Scatter/Gather list elements from the host computer cannot be executed concurrently, because both tasks require the same hardware, i.e., command module 216 in first I/O bus interface hardware block 210 in I/O bus interface circuit 200. Thus, each of these tasks could share a common-return address stack 246. However, a task that fetches new commands from the host computer, and a task that fetches data from a SCSI target (not shown) can be executed concurrently, because these tasks utilize different hardware, i.e., module 222 and module 217 in I/O bus interface circuit 200. Since each of these tasks could save a return address prior to the event associated with the other task, independent stacks 246 and 247 are required. In this embodiment, sequencer 236 loads a stack identifier in a stack select register 236 to select the appropriate stack.

As described above, routines used for more than one module within a given interface hardware block utilize the same set of logical addresses. (Herein, routines and tasks are used interchangeably. Those of skill in the art will understand that a routine is a set of firmware instructions that is executed by the sequencer; and a task is the operation performed by the execution of the routine.) Consequently, each routine, which utilizes circuitry in interface hardware block 210, causes sequencer 230 to write a unique stack select identifier to stack select register 236. Similarly, each routine that utilizes circuitry in interface hardware block 220 causes sequencer 230 to write a different unique stack select identifier to stack select register 236. The unique stack selector in stack select register 236 is used to select a stack where execution of the call instruction stores the return address.

Hence, a common stack can be used for all routines that utilize the same hardware in I/O bus interface circuit 200 and so a common stack is built by use of the same stack selector in these routines. Routines that utilize different hardware use different unique stack selectors and so utilize independent stacks.

In another embodiment of I/O interface circuit 200A (FIG. 2B), stack select register 236 and mode select register 234 of FIG. 2A are the same register. In this embodiment, independent stacks 213S, 215S, 217S, 223S, and 225S are located within dedicated module memories 213, 215, 217, 223, and 225, respectively, and the common stack for each module is also located in that module's dedicated module memory, which in one embodiment is a module register set. In this embodiment, sequencer 230 uses a module identifier in mode select register 234 to select a particular stack.

Figure 2B:
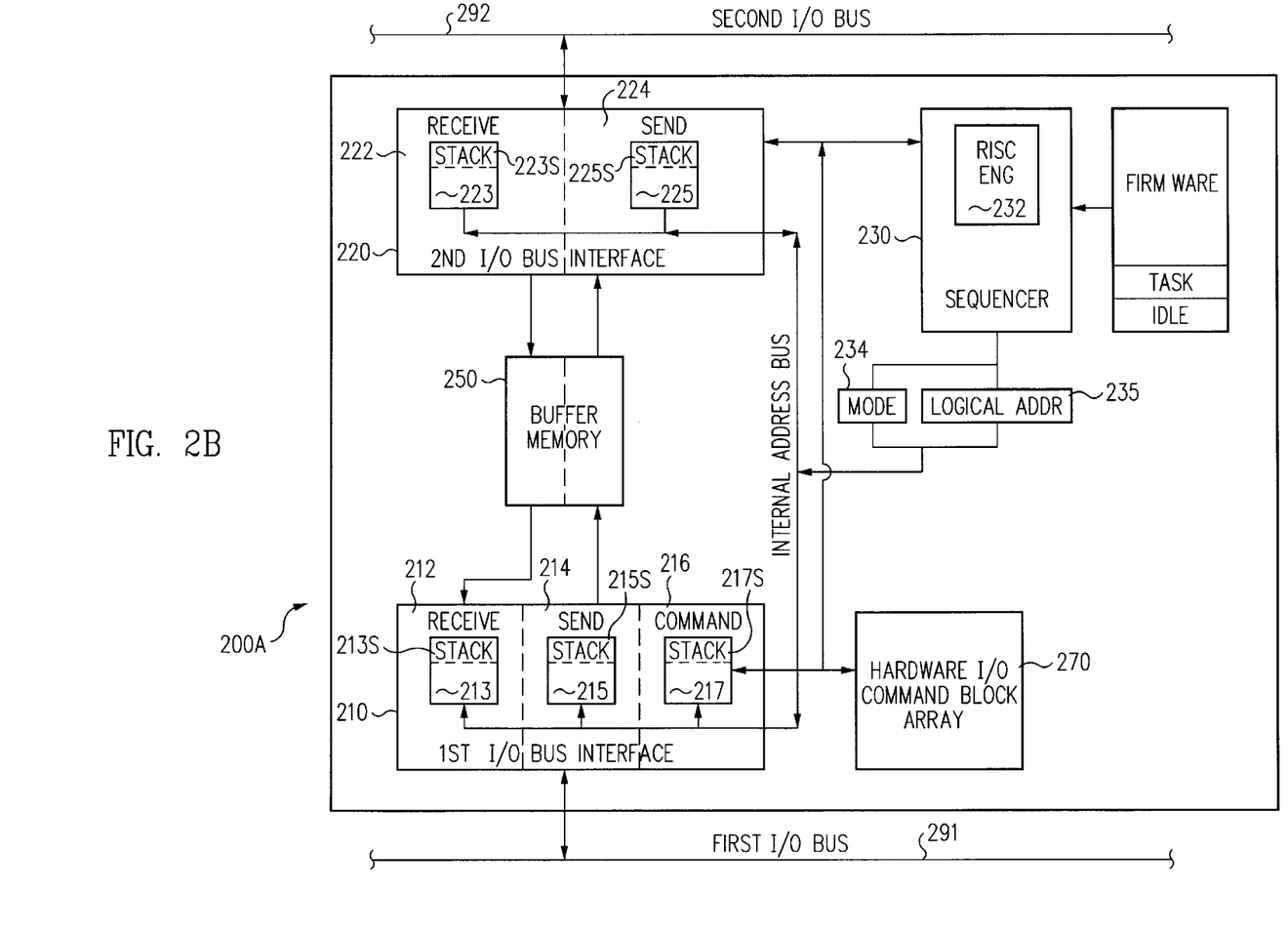
FIG. 2B is a block diagram of a second embodiment of an integrated circuit that is an interface between two I/O buses, and that includes the novel architecture and implements the novel method for suspending and resuming tasks in a multi-tasking environment, according to the principles of this invention.

Through use of the mode identifier when sequencer 230 suspends execution of a routine for a module, the call instruction places the return address on the stack for that module. When sequencer 230 returns to a particular module for which execution was suspended, the return address is on the stack within the memory module of that module.

In yet another embodiment of I/O bus interface circuit 200B, a single stack 245A (FIG. 2C) is utilized to store the return addresses of all firmware routines. In this embodiment, call idle operation 303 writes the return address for the routine, e.g., the address of re-entry point 304, to stack 245A, and calls the idle loop routine.

Hence, independent of the particular method used to store the return address, call idle operation 303 saves the return address on a stack, and causes sequencer 230 to start execution of the firmware idle loop routine. As described more completely below, the specific operations performed in the idle loop are dependent upon which method, a single stack or multiple stacks, is used to store return addresses of suspended routines.

Figure 2C:
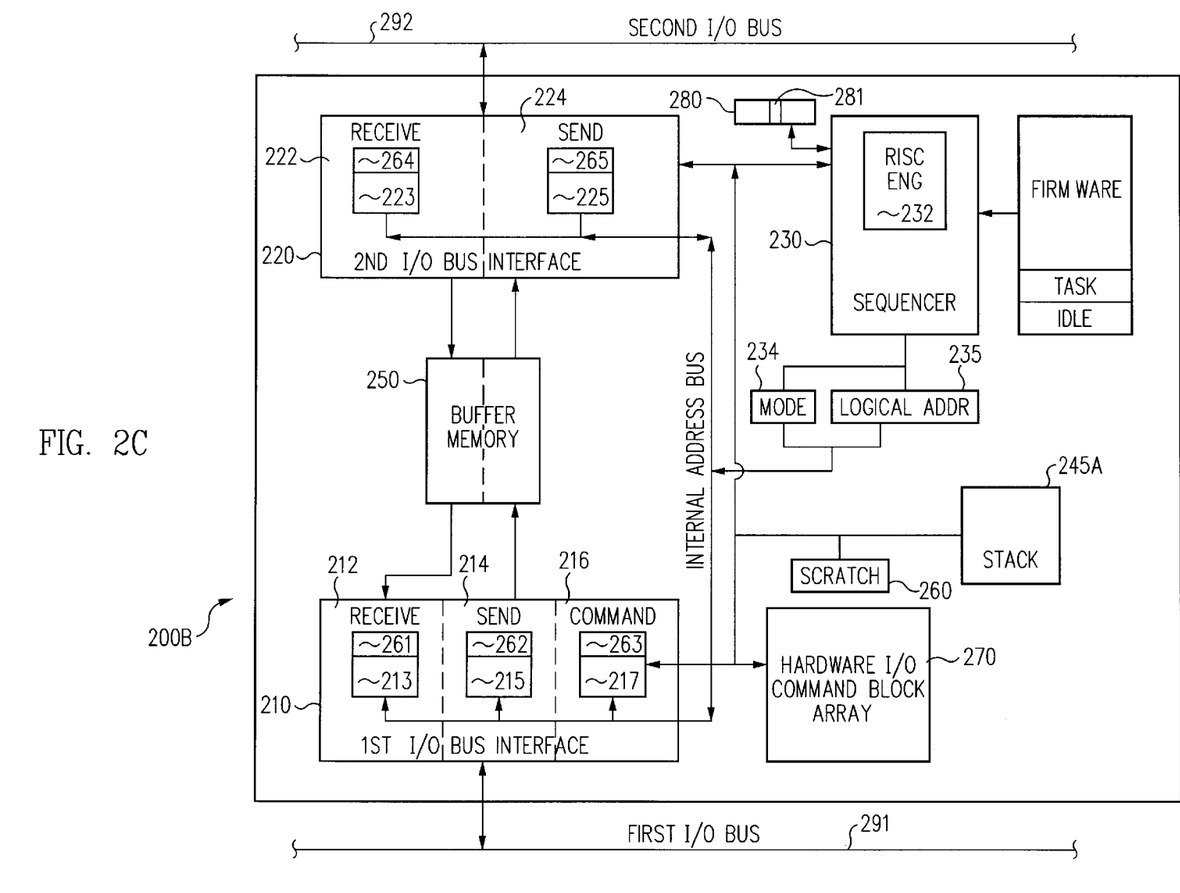
FIG. 2C is a block diagram of a third embodiment of an integrated circuit that is an interface between two I/O buses, and that includes the novel architecture and implements the novel method for suspending and resuming tasks in a multi-tasking environment, according to the principles of this invention.

For an embodiment that utilizes a single stack for the return address of a suspended routine such at that illustrated in FIG. 2C, upon entering idle loop process 400 (FIG. 4A) from a call in process 300, the return address is removed from stack 245A, and written in scratch register 260 in save return operation 401.

Herein, a scratch register is an example of one type of memory suitable for use in this invention. Those of skill in the art will appreciate that this is only one of the many types of memory that could be used in the invention. The particular type of memory selected will depend upon the memory available in the I/O bus interface circuit that is available for implementation of this invention.

Figure 4A:
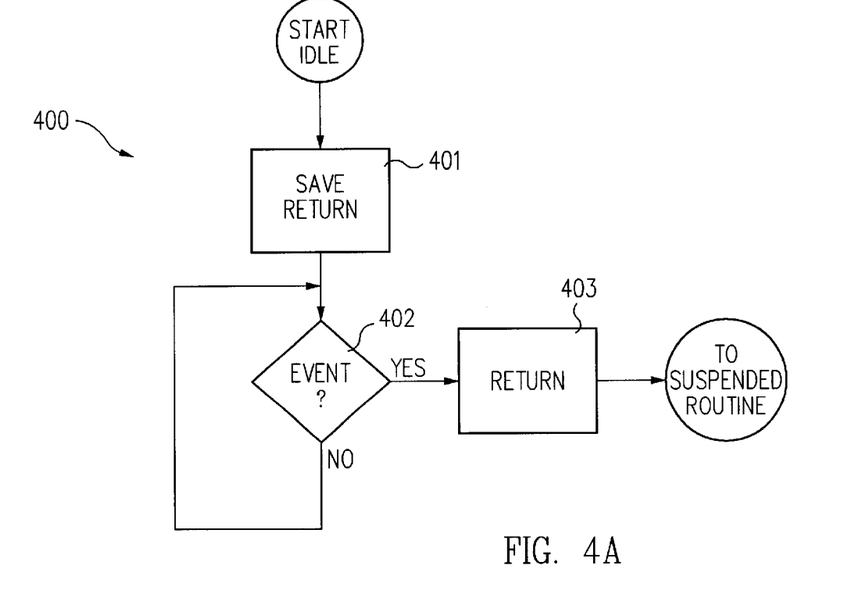
FIG. 4A is a first embodiment of an idle loop routine process flow diagram according to the principles of this invention.

Operation 401 transfers to event check 402, which detects when an event occurs and transfers processing to return operation 403. Return operation 403 executes a single instruction which moves the return address stored in scratch register 260 to stack 245A and returns processing to process 300 (FIG. 3). Hence, a single return instruction moves the saved address back onto the stack and returns execution to suspended routine 300. In response to the return, sequencer 230 transfers processing to the routine associated with the physical address on stack 245A, which is re-entry point 304 in suspended routine 300. This same return instruction is used for all suspended routine re-entries from idle loop 300. The prior art tag scheme required an instruction for each re-entry point, which in turn required more instructions and execution time to find the return address associated with a particular event.

At most the method of this invention requires one check for each independent hardware module of the integrated circuit for each event. For example, if integrated circuit 200C has three independent modules 212, 214, and 216 within first I/O bus interface hardware block 210 that can perform a DMA transfer over bus 291, at most three checks would be required to determine which modules have DMA done events. In contrast, the prior art method required a check for each re-entry point in each routine in which the particular event could occur.

Upon return to process 300, operations 305 to 308 are executed in a manner similar to that described above for operations 301 to 304, respectively. Thus, operations 305 to 308 are not considered in further detail.

In another embodiment that utilizes a single stack 245A for all modules 212 214, 216, 222, and 224, there are different scratch registers for different modules. For each scratch register, only one of the different routines associated with that module can be executed at a time.

For the embodiment of FIG. 2C, the different routines are associated with a module, and only one routine for a module can be executed at a time. Hence, when sequencer 230 removes a return address of a routine from stack 245A, sequencer 230 saves the return address in the scratch register associated with the module that the routine was using. The module identifier in mode select register 234 is used to identify the appropriate scratch register.

Figure 4B:
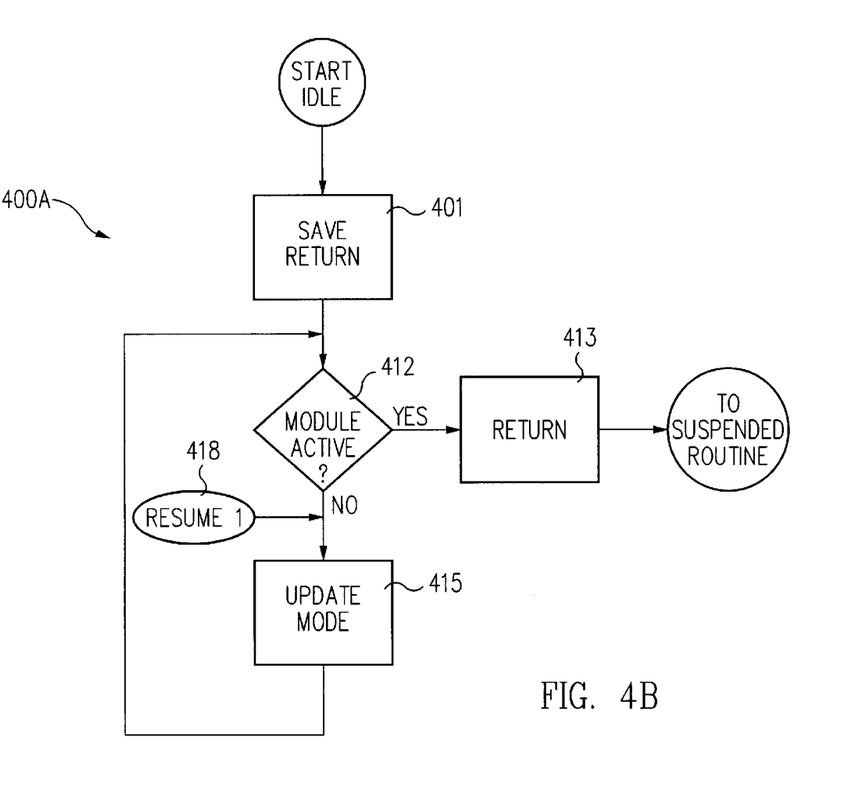
FIG. 4B is a second embodiment of an idle loop routine process flow diagram according to the principles of this invention.

Therefore, in this embodiment, when an I/O bus interface integrated circuit contains m independent hardware modules, where m is an integer, there are m scratch registers for return addresses. Thus, for the embodiment of FIG. 2C, there are five scratch registers 261 to 265. In this embodiment, a different embodiment of the idle loop routine is used. Idle loop process 400A is illustrated in FIG. 4B. Again, when idle loop routine 400A is called, save return operation 401 moves the return address on stack 245A to the appropriate one of scratch registers 261 to 265, based upon the value of the mode identifier in mode select register 234 and transfers processing to module active check 412.

If execution of a routine for a module has been suspended, it means that the module needed to perform an operation that required a period of time and so the routine execution was suspended so that sequencer 230 could perform other tasks. Thus, module active check 412 determines whether the module identified by the mode identifier in mode select register 234 is busy. For example, for modules 212, 214, and 216, a DMA enabled bit is read in the module identified by the mode identifier. If the bit is set, the module is active and so processing transfers to return operation 413 and otherwise to update mode operation 415.

Figure 5:
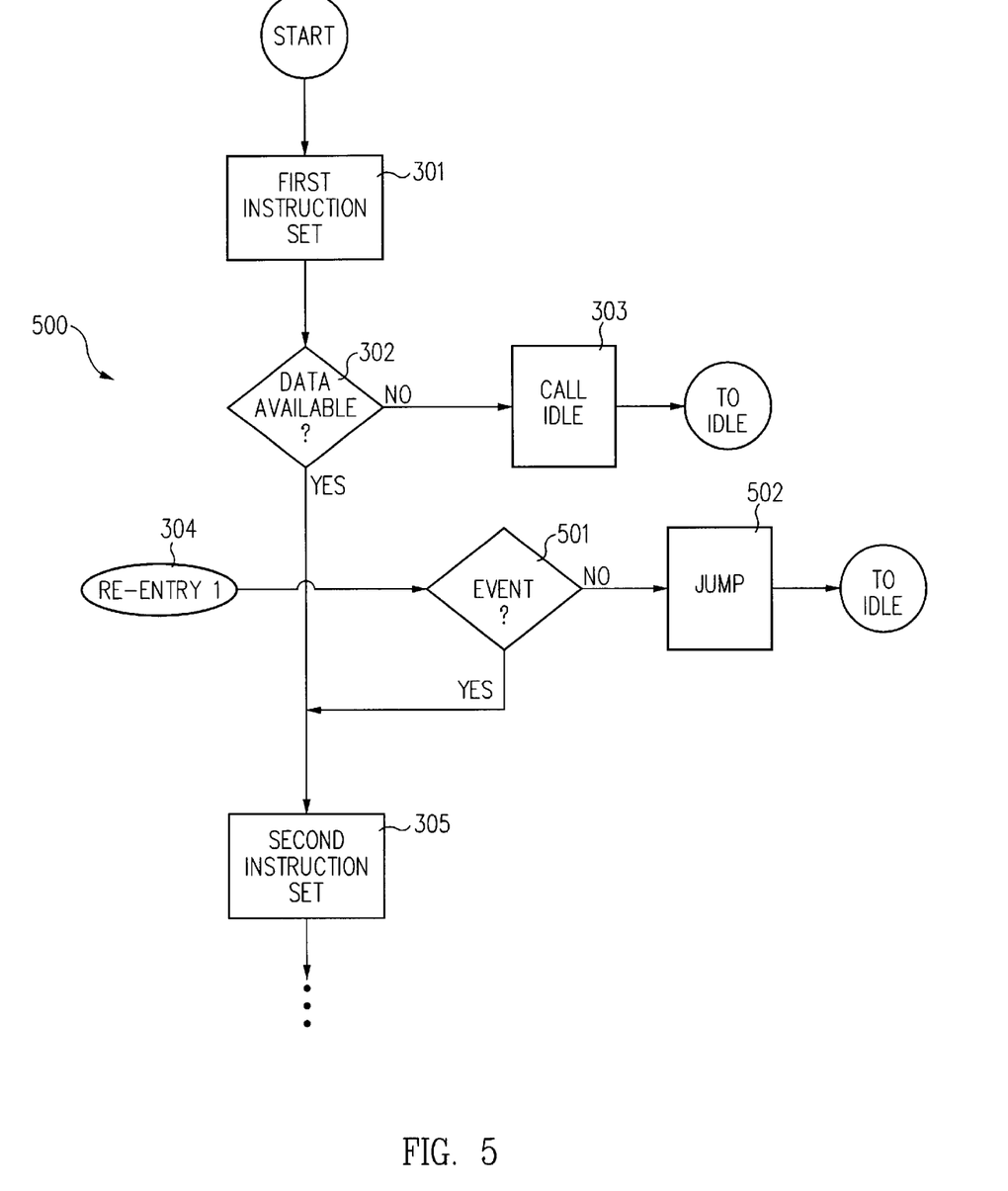
FIG. 5 is a process flow diagram for a routine that utilizes a single instruction to save a return address, and to transfer to another routine, and that includes event checking according to the principles of this invention.

Return operation 413 restores the address saved in scratch register 263 to stack 245A, and returns to re-entry point 304 of process 500 in FIG. 5. In FIG. 5, elements with the same reference numeral as in FIG. 3 are the same element, and so the description associated with FIG. 3 is incorporated herein by reference.

In this embodiment, re-entry point 304 transfers processing to event check 501 within process 500. Event check 501 determines whether the event needed to continue with execution of second instruction set operation 305 has occurred. If the event has occurred, processing transfers to second instruction set 305 and otherwise to jump operation 502. Jump operation 502 returns processing to the location in the idle loop immediately after check 412, which is resume point 418.

Processing is transferred through resume point 418 to update mode operation 415. Update mode operation 415 changes the value of the mode identifier in mode select register 234 and transfers processing to module active check 412. If the next module is also busy, return operation 403 restores the return address in the scratch register of that module to stack 245A and processing transfers to the re-entry point in the routine that was suspended for that module.

Hence, in this embodiment, no event testing is done in idle loop process 400A. Rather the idle loop uses the return address stored in the scratch register for a busy module that has routine execution suspended, and branches back into the suspended routine for the busy module. The event is checked within the routine. Hence, for each pass through the idle loop, only the event associated with the suspended routine is checked. Further, such an event can be unique to that routine, and this unique event requires no special handling in the idle loop 400A. In contrast, in the prior art tag method, every possible event had to be checked on each pass through the idle loop. Consequently, this invention saves considerable execution time by eliminating the time required to test for events that are not currently of interest.

The above description assumed that a single stack 245A was used by all routines. The idle loop processing is simplified further if multiple stacks are used, and the stacks are implemented in the module memory as illustrated in FIG. 2B. In this embodiment, the idle loop does not need to remove the return address from the stack because when sequencer 230 changes the mode select identifier in register 234 and starts to execute a routine associated with another module, the return address is saved in the stack in the module for which the routine was suspended. Consequently, save return operation 401 can be eliminated from the idle loop process. The other operations for this embodiment are similar to those described above and so are not repeated.

In one embodiment, a single I/O bus interface integrated circuit is configured to permit operation in either a single stack mode as in FIG. 2C, or a multiple stack mode as in FIG. 2B. In this I/O bus interface integrated circuit, a status word 280(FIG. 2C), that is configured at start-up, includes a stack mode definition bit 281 that is configured to select either a single stack mode of operation, or multiple stack mode of operation. The stack mode selection also selects the appropriate firmware routines to support the desired stack mode of operation. Alternatively, at appropriate points in the firmware, the stack mode definition bit can be tested and the firmware either executes or branches around certain instructions depending on the stack mode selected.

While the operation and use of this invention has been described using only two modules, the extension to multiple modules will be apparent to those of skill in the art in view of this disclosure. In one embodiment, the single stack architecture and method was implemented in the I/O bus interface integrated circuit described in copending, commonly filed, and commonly assigned U.S. patent application Ser. No. 09/089,013, entitled "System for Register Partitioning in Multi-Tasking Host Adapters by Assigning a Register Set and a Unique Identifier in Each of a Plurality of Hardware Modules," of B. Arlen Young, which is incorporated herein by reference in its entirety. Further, the principles of the invention are applicable to any interface integrated circuit that includes the basic elements shown in FIGS. 2A to 2C.

The embodiments of the invention described above are only illustrative of the invention and are not intended to limit the invention to the particular embodiments described. In view of this disclosure, those of skill in the art can utilize the invention in any integrated circuit that includes a plurality of modules that are used in interfacing two I/O buses; where the tasks performed by the modules are specified in I/O command blocks; and where the operations performed by the modules are controlled by an on-chip sequencer.

I claim:

1. A method for suspending and resuming tasks in a multi-tasking integrated circuit interfacing two I/O buses wherein said multi-tasking integrated circuit interfacing two I/O buses includes an on-chip sequencer that executes a plurality of routines to control operation of a plurality of I/O bus interface circuits within said multi-tasking integrated circuit interfacing two I/O buses, said method comprising:

suspending execution of a first routine, that is used with a first I/O bus interface circuit in said multi-tasking integrated circuit interfacing two I/O buses, by executing a single instruction to branch from said first routine to a second routine,
wherein executing said single instruction includes writing a return address for the first routine in a first storage location, and branching to said second routine; and
said single instruction is executed by said on-chip sequencer; and returning from said second routine to said first routine by executing a single instruction that restores said return address in said first storage location, and that causes said on-chip sequencer to resume execution of said first routine at said return address.

2. The method of claim 1 wherein said first storage location is on a stack used by all of said plurality of routines.

3. The method of claim 2 further comprising:
moving said return address from said first storage location to a second storage location upon execution of said second routine.

4. The method of claim 3 further comprising:
moving said return address from said second storage location to said first storage location and returning to execution of said first routine by execution of a single instruction in said second routine.

5. The method of claim 2 wherein said second routine is an idle loop routine.

6. The method of claim 5 further comprising:
moving said return address from said first storage location to a second storage location upon execution of said idle loop routine.

7. The method of claim 6 further comprising:
checking for an event during execution of said idle loop routine.

8. The method of claim 7 further comprising:
moving said return address from said second storage location to said first storage location upon detection of said event in said idle loop routine, and returning to execution of said first routine by executing a single instruction in said idle loop routine.

9. The method of claim 6 further comprising:
returning from said from second routine to said first routine to check for an event.

10. The method of claim 9 further comprising:
checking for an event in said first routine.

11. The method of claim 10 further comprising:
transferring from said first routine to said second routine upon said checking for an event failing to detect an event.

12. The method of claim 1 wherein said first storage location is on a stack accessed only by routines used with a module.

13. The method of claim 12 wherein said stack is included in a module memory of said module.

14. The method of claim 12 further comprising:
selecting said stack using a module identifier.

15. The method of claim 1 wherein said first storage location is on a stack used by multiple routines, and further wherein said multiple routines are used with one I/O bus circuit in said plurality of I/O bus interface circuits and only one of said multiple routines can be executed at a time.

16. An I/O bus interface integrated circuit having a plurality of modules for interfacing with I/O buses, and an on-chip sequencer, said I/O bus interface circuit comprising:
a stack select register wherein information in said stack select register is used in addressing one of a common stack used by said on-chip sequencer as storage for return addresses of suspended routines, and independent stacks used by said on-chip sequencer for return addresses of suspended routines;
a stack mode definition bit wherein when said stack mode definition bit has a first state, said common stack is used by said on-chip sequencer, and when said stack mode definition bit has a second state, said independent stacks are used by said on-chip sequencer.

17. The I/O bus interface integrated circuit of claim 16 wherein said stack mode definition bit has said second state, and said I/O bus interface integrated circuit further comprises:
a different module memory for each of said plurality of modules; and
an independent stack within each different module memory.

18. The I/O bus interface integrated circuit of claim 16 wherein said stack mode definition bit has second state, and said I/O bus interface integrated circuit further comprises:
a mode select register wherein information in said mode select register selects one module memory at a time.

19. The I/O bus interface integrated circuit of claim 18 wherein mode select register and said stack select register are the same register.

* * * * *